(12) United States Patent
Adams et al.

(10) Patent No.: US 7,664,119 B2
(45) Date of Patent: Feb. 16, 2010

(54) METHOD AND APPARATUS TO PERFORM NETWORK ROUTING

(75) Inventors: Steve Adams, Hillsboro, OR (US); Rajendra Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 09/823,459

(22) Filed: Mar. 30, 2001

(65) Prior Publication Data

US 2003/0016679 A1 Jan. 23, 2003

(51) Int. Cl.
*H04L 12/56* (2006.01)
(52) U.S. Cl. .................... 370/400; 370/238; 370/238.1; 370/395.3; 370/401; 370/465
(58) Field of Classification Search ................. 370/389, 370/395.31, 400, 409, 424, 238, 238.1, 395.3, 370/401, 465
See application file for complete search history.

(56) References Cited

U.S. PATENT DOCUMENTS

| | | | | |
|---|---|---|---|---|
| 5,048,011 A | * | 9/1991 | Melen | 370/422 |
| 5,440,547 A | * | 8/1995 | Easki et al. | 370/395.3 |
| 5,802,316 A | * | 9/1998 | Ito et al. | 709/249 |
| 6,205,148 B1 | * | 3/2001 | Takahashi et al. | 370/401 |
| 6,343,326 B2 | * | 1/2002 | Acharya et al. | 709/238 |
| 6,366,563 B1 | * | 4/2002 | Weldon et al. | 370/252 |
| 6,438,612 B1 | * | 8/2002 | Ylonen et al. | 709/249 |
| 6,493,318 B1 | * | 12/2002 | Bare | 370/238 |
| 6,493,349 B1 | * | 12/2002 | Casey | 370/409 |
| 6,496,510 B1 | * | 12/2002 | Tsukakoshi et al. | 370/401 |
| 6,515,999 B1 | * | 2/2003 | Nagami et al. | 370/409 |
| 6,545,781 B1 | * | 4/2003 | Chang et al. | 359/124 |
| 6,614,781 B1 | * | 9/2003 | Elliott et al. | 370/352 |
| 6,618,377 B1 | * | 9/2003 | Miriyala | 370/395.1 |
| 6,625,658 B1 | * | 9/2003 | Oguchi et al. | 709/238 |
| 6,765,872 B1 | * | 7/2004 | Tazaki | 370/235 |
| 6,785,273 B1 | * | 8/2004 | Verma | 370/389 |
| 6,898,641 B1 | * | 5/2005 | Kobayashi | 709/238 |
| 7,046,680 B1 | * | 5/2006 | McDysan et al. | 370/396 |
| 7,123,620 B1 | * | 10/2006 | Ma | 370/395.32 |
| 7,320,034 B2 | * | 1/2008 | Fichou et al. | 709/227 |
| 2002/0083194 A1 | * | 6/2002 | Bak et al. | 709/238 |
| 2007/0147254 A1 | * | 6/2007 | Larsson et al. | 370/238 |

FOREIGN PATENT DOCUMENTS

| | | |
|---|---|---|
| EP | 0 790 726 A2 | 8/1997 |
| EP | 0 915 594 A2 | 5/1999 |
| WO | WO 01/20856 A | 3/2001 |

OTHER PUBLICATIONS

Anderson, T., "IETF Draft: Requirements for Separation of IP Control and Forwarding," Internet Draft, Feb. 1, 2001, XP002208593, pp. 1-6.
Walker et al., "Cops Over TLS," Internet Draft, Feb. 23, 2001, XP002208592, pp. 1-7.
Yavatkar et al., "IETF RFC 2814: A Protocol for RSVP-based Admission Control over IEEE 802-style Networks," May 1, 2000, XP002208591, pp. 1-60.

* cited by examiner

*Primary Examiner*—William Trost, IV
*Assistant Examiner*—Toan D Nguyen
(74) *Attorney, Agent, or Firm*—Kacvinsky LLC (57) ABSTRACT

A method and apparatus to route information over a network is described.

17 Claims, 4 Drawing Sheets

METHOD AND APPARATUS TO PERFORM NETWORK ROUTING

BACKGROUND

Routing packets over a network may require a significant amount of resources from a network device. For example, the network device may have to search a routing table for routing information. Depending on the size of the routing table, the search may consume a significant amount of time. Since a network device typically routes a relatively large number of packets, even minor variations in search time per packet may dramatically affect overall performance of the network device. Further, a host of new routing services are currently being developed that may require even more complex routing functionality, such as dynamically updating the routing table, thereby requiring more sophisticated hardware and software for the network device. This may in turn increase the overall cost of the network device.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention.

Embodiments of the invention may improve performance of a communications network, such as a packet switching network. One embodiment of the invention improves performance of a packet switching network by improving the routing of packets within the network. Routing in this context refers to moving a packet from one network device to another network device until the packet reaches a given destination.

Packet switching continues to be an effective technology for voice and data communications. Packet switching in this context may refer to communicating information over a network in the form of relatively short packets. A packet in this context refers to a set of information of a limited length, with the length typically represented in terms of bits or bytes. An example of a packet length might be 1000 bytes. A network typically comprises a number of nodes interconnected by a communications medium. The nodes may be capable of communicating information to other nodes over a communications medium using one or more protocols. A node in this context may include any device capable of communicating information, such as a computer, server, switch, router, bridge, gateway and so forth. A communications medium may be any medium capable of carrying information signals, such as twisted-pair wire, co-axial cable, fiber optics, radio frequencies and so forth. A protocol may comprise a set of instructions by which the information signals are communicated over the communications medium. For example, the protocol might be a data transfer protocol or packet forwarding protocol, such as the Transmission Control Protocol (TCP) as defined by the Internet Engineering Task Force (IETF) standard 7, Request For Comment (RFC) 793, adopted in September, 1981, and the Internet Protocol (IP) as defined by the IETF standard 5, RFC 791, adopted in September, 1981, both available from "www.ietf.org" ("TCP/IP Specification").

A packet switching network may comprise a source node, a destination node, and a number of intermediate nodes. The source node may comprise a node that originates a set of information for delivery to the destination node. Information may comprise any data capable of being represented as a signal, such as an electrical signal, optical signal, acoustical signal and so forth. Examples of information in this context may include data from a voice conversation, videoconference, streaming video, electronic mail ("email") message, voice mail message, graphics, image, video, text and so forth. The destination node may comprise a node that receives information. The intermediate nodes may comprise nodes that communicate the information from the source node to the destination node.

In operation, the source node may send information to the destination node through one or more intermediate nodes in the form of packets. The source node breaks a set of information into a series of packets. Each packet may contain a portion of the information plus some control information. The control information may assist intermediate nodes in the network to route each packet to the destination node. The source node sends the packets over the network, where an intermediate node receives the packets, stores them briefly, and passes them to the next intermediate node. This continues to occur until the destination node eventually receives the entire series of packets and uses them to reproduce the information from the source node. The various connections and intermediate nodes that are used to transport packets between a source node and a destination node are typically referred to collectively as a "routing path."

Each intermediate node is assigned some level of responsibility for routing a packet. Typically, each intermediate node has a routing table storing routing information for a packet. Once an intermediate node receives a packet, it searches the routing table for the appropriate routing information. The routing information may comprise addressing information for the next node that should receive the packet, for example. The intermediate node may then forward the packet to the next intermediate node using the addressing information.

The routing table may be used to implement a number of different routing algorithms, many of which require a different level of sophistication in terms of hardware and software complexity. For example, a router may employ static routing, default routing or dynamic routing. Static routing may refer to routes to destinations that are manually listed in a routing table. The routing table typically does not change as the network changes. Default routing is similar to static routing, but when a packet has a destination that is unknown to the router it will be sent to a default address for handling. Dynamic routing may refer to routes being learned via an internal or external routing protocol. In dynamic routing, the routing table may be periodically updated to reflect changes in the network. For example, if a particular destination is out of service, the route may disappear from the routing table, and traffic would not be sent toward that destination. Examples of dynamic routing may include distance vector protocols such as the Routing Information Protocol (RIP) Version 2 Standard as defined by IETF RFC 1058, adopted in November 1998 ("RIP Specification"), and link state protocols such as the Open Shortest Path First (OSPF) Version 2 Draft Standard as defined by the IETF RFC 1583, March 1994("OSPF Specification"), both available at "www.ietf.org," and the International Standards Organization (ISO) 10589 Intermediate System-to-Intermediate System (ISIS) routing protocol, adopted in February 1990("ISIS Specification"). Of the above-discussed routing protocols, nodes employing the dynamic routing protocols typically have more sophisticated, and therefore expensive, hardware and software requirements.

In addition to the routing functionality, an intermediate node may offer advanced network services. The term "advanced network services" as used herein may refer to any network service other than routing. For example, an intermediate node may include the necessary software and hardware to perform various functions, such as implementing a firewall, network address translation (NAT), port address translation (PAT), label switching, TCP connection termination, traffic tagging, traffic engineering or shaping services, or operating as a virtual private network (VPN) gateway, virtual router, virtual local area network (VLAN), public switched telephone network (PSTN) gateway, voice extensible markup language (XML) processor, and so forth, although the embodiments of the invention are not limited in this context. Other examples of advanced network services may include the intermediate node operating in accordance with a voice over IP (VoIP) standard, such as the "Packet Based Multimedia Communications Systems" as defined by the International Telecommunications Union Telecommunications (ITU-T) Recommendation H.323, adopted in February 1998, available from "www.itu.int" ("H.323 Specification"), or other protocols such as the "SIP: Session Initiation Protocol" as defined by the IETF Proposed Standard, RFC 2543, published in March 1999, and available from "www.ietf.org" ("SIP Specification). These are just examples and many other protocols may be employed in alternating embodiments.

Consequently, the cost and complexity of an intermediate node may increase depending on the type of routing or advanced network services implemented by the intermediate node. Given the sheer number of intermediate nodes available in a network, it may not make sense to have each intermediate node implement this type of functionality. In addition, implementation of many of these services may consist of two parts, including packet forwarding from an incoming physical interface to another after changing the header and/or queuing, and processing of control information such as routing updates, label updates, and so forth. It may not be necessary to have each intermediate node implement both of these functions. Rather, some intermediate nodes may only perform basic packet forwarding leaving complex control processing to other more sophisticated network nodes.

Consequently, one embodiment of the invention may perform advanced routing services (ARS) and advanced network services (ANS) in one or more intermediate nodes. These one or more intermediate nodes may be referred to herein as a Hosted Advanced Routing Server (HARS). In one embodiment of the invention, the HARS may comprise one or more servers. The term "server" as used herein may refer to any computer system comprising, for example, a processor and memory. Virtual connections may then be created between the HARS and various other intermediate nodes. Once an intermediate node receives a packet requiring ARS or ANS functionality implemented by a HARS, the intermediate node may forward the packet to the HARS for processing, or alternatively, request information from the HARS to process the packet itself. In this manner, resource intensive and complex operations may be offloaded to the HARS, thereby potentially reducing the cost and complexity of one or more intermediate nodes.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
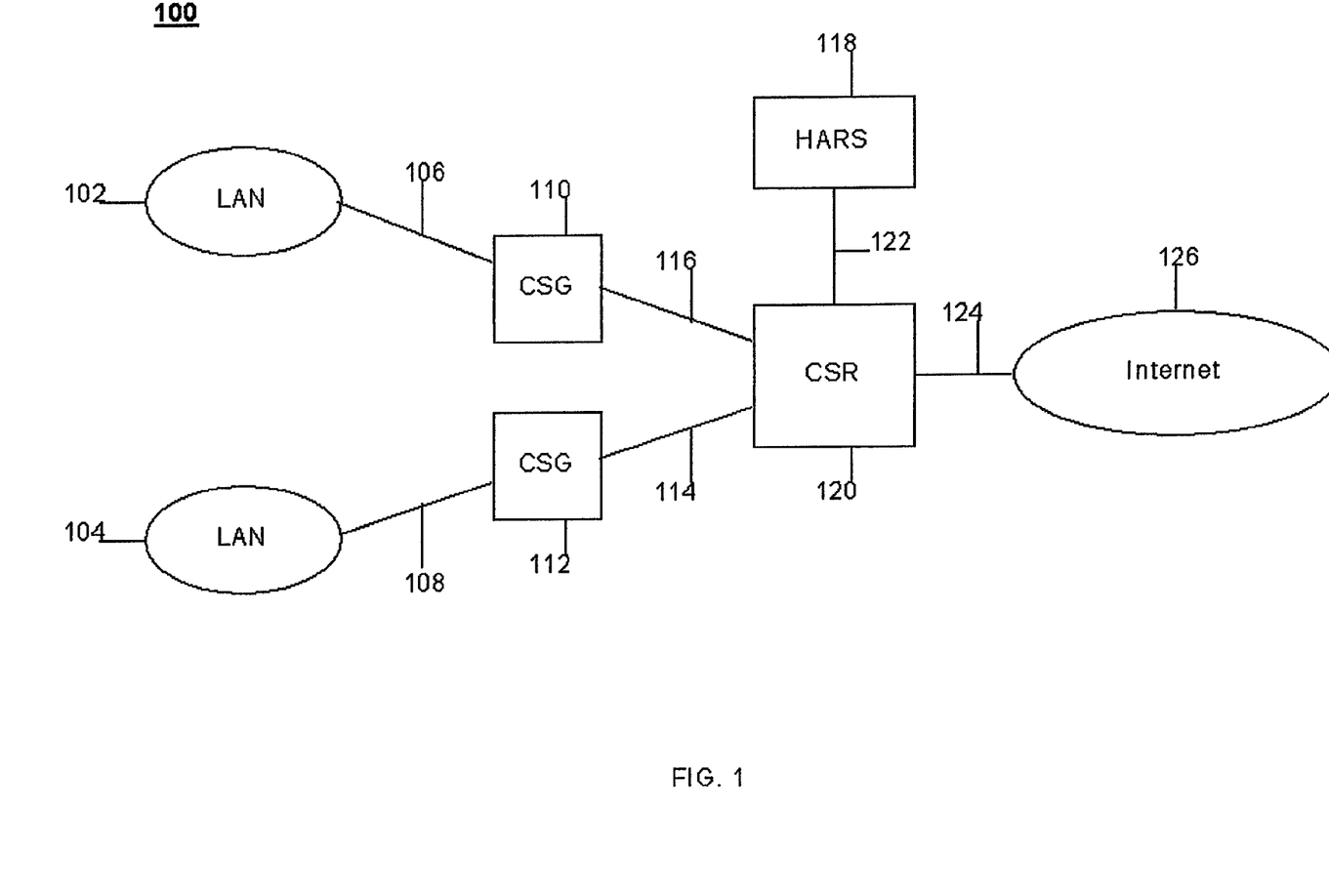
FIG. 1 is a system suitable for practicing one embodiment of the invention.

Referring now in detail to the drawings wherein like parts are designated by like reference numerals throughout, there is illustrated in FIG. 1 a system suitable for practicing one embodiment of the invention. FIG. 1 is a block diagram of a system 100. System 100 comprises Local Area Networks (LAN) 102 and 104 connected to Client Service Gateways (CSG) 110 and 112, respectively, via communication links 106 and 108, respectively. CSGs 110 and 112 are both connected to a Central Site Router (CSR) 120 via communication links 116 and 114, respectively. CSR 120 is connected to a HARS 118 via communication link 122. CSR 120 is also connected to a network 126. In one embodiment of the invention, system 100 may operate in accordance with one or more Internet protocols, such as the protocols described in the TCP/IP Specification.

In one embodiment of the invention, CSG 110, CSG 112 and CSR 120 may be routers. A router may be defined herein as a node that performs routing for one or more packets. This is accomplished using routing information typically stored in a routing table. In this embodiment of the invention, CSG 110, CSG 112 and CSR 120 are configured to perform basic routing functions, such as static or default routing protocols, although the embodiments of the invention are not limited to this context. Since they are configured to perform basic routing functions, the complexity and therefore cost of these routers is typically less than conventional routers capable of performing more advanced routing algorithms.

In one embodiment of the invention, HARS 118 may comprise a server. HARS 118 may also comprise, however, a cluster of servers, a router, a switch, a gateway, a bridge, or some other network device, and still fall within the scope of the invention. In this embodiment of the invention, HARS 118 may be configured to perform ARS or ANS functionality. For example, HARS 118 may operate to perform an ARS function such as dynamic routing, thereby building a routing table that contains collective information on all the best paths to all the destinations HARS 118 may know how to reach. HARS 118 may, for example, announce and receive route information communicated by other routers. In one embodiment of the invention, HARS 118 may implement an ARS in accordance with a link state protocol. Link state protocols may operate on the basis that various network devices exchange information elements, sometimes referred to as "link states," which carry information about links and nodes in a network. This information goes into building, maintaining and updating its routing tables.

Once HARS 118 receives a packet, it retrieves control information from the received packet. The control information may comprise, for example, a source IP address, a destination IP address, source port number, destination port number, status indicators, type of service (TOS) indicators and so forth. Using one or more pieces of the control information, HARS 118 may search its routing table to find advanced routing information. Once the advanced routing information is located, the packet may be sent to its next destination in the network, such as another intermediate node that is typically closer to the destination node, or the destination node itself. The process repeats until the packet finds its way through the network to its final destination. Examples of ARS implemented by HARS 118 may include implementing one or more advanced routing protocols, such as dynamic routing protocols implemented in accordance with the OSPF Specification and ISIS Specification, although HARS 118 is not limited to this context.

As a result of this type of routing implementation, substantial cost savings may be realized since less complex routers may be utilized in the network. Further, as new services and technologies are introduced in a network, they may be implemented by updating HARS 118 rather than all the routers in the network, thereby avoiding what is typically a costly and time-consuming process.

In one embodiment of the invention, CSG 110, CSG 112 and CSR 120 may each be connected to HARS 118 by a secure virtual connection. Each connection may be accomplished using, for example, a Virtual Private Network (VPN) tunnel from each device to HARS 118. Whenever CSG 110, CSG 112 or CSR 120 receives a packet having control information indicating that ARS or ANS functionality is needed, it may forward the packet to HARS 118 via the VPN tunnel for processing. Such control information indicating the need for ARS or ANS functionality may comprise, for example, a source address, a destination address, a protocol identifier, a source port number, a destination port number, a TOS byte, a label, a predefined identifier, a status flag, control word or other indicator. HARS 118 may receive the packet and perform the appropriate function, and may send the packet either back to the forwarding device for processing, or to the next node as indicated by the routing information stored in a routing table for HARS 118.

It can be appreciated that although only three network nodes are illustrated in FIG. 1, that any number of network nodes may be present in system 100 and still fall within the scope of the embodiments of the invention. System 100 illustrates CSG 100, CSG 112, CSR 120 for purposes of clarity and is not limited in this context. More details with respect to CSG 110, CSG 112, CSR 120 and HARS 118, will be described below with reference to FIGS. 2-4.

Figure 2:
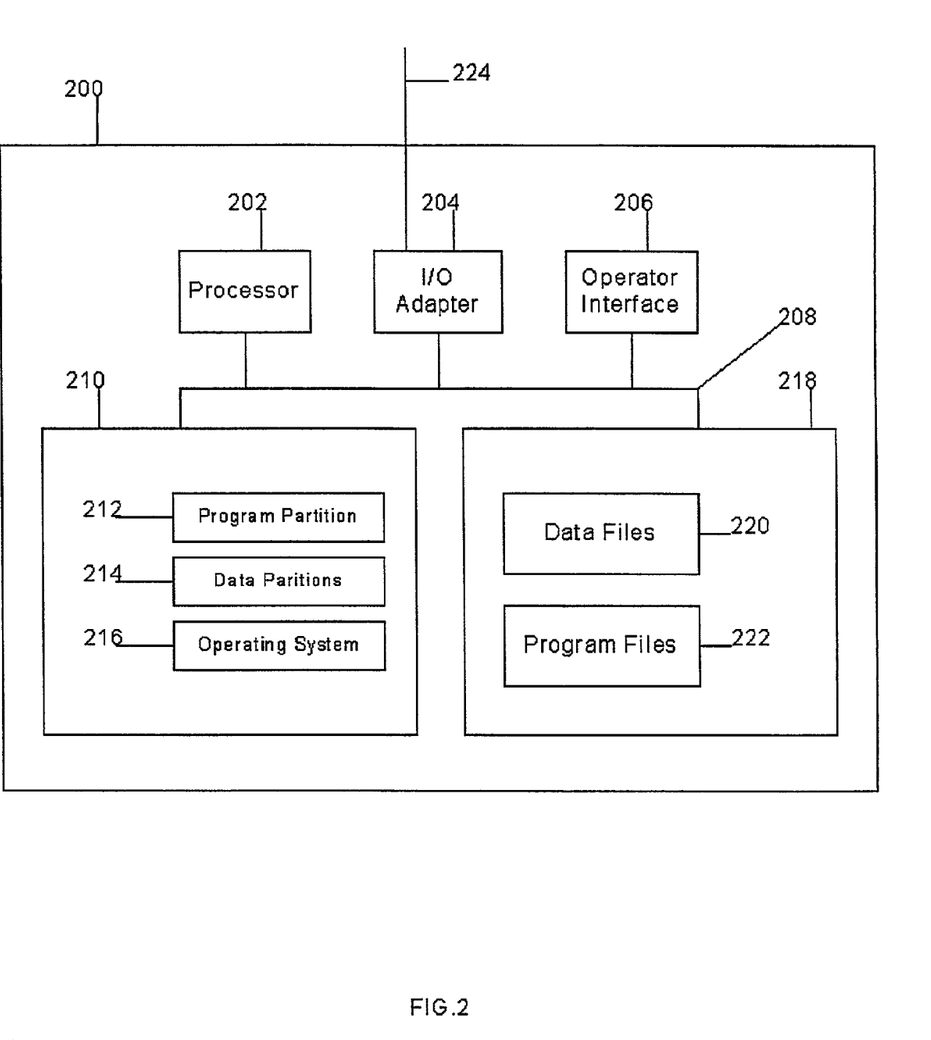
FIG. 2 is a block diagram of a Hosted Advanced Routing Server (HARS) in accordance with one embodiment of the invention.

FIG. 2 illustrates a HARS in accordance with one embodiment of the invention. FIG. 2 comprises a HARS 200 that may be representative of HARS 118. As shown in FIG. 2, HARS 200 includes a processor 202, an input/output (I/O) adapter 204, an operator interface 206, a memory 210 and a disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++ and assembly. Processor 202 executes the program instructions, and processes the data, stored in memory 210. Disk storage 218 stores data to be transferred to and from memory 210. I/O adapter 204 communicates with other devices and transfers data in and out of the computer system over connection 224. Operator interface 206 may interface with a system operator by accepting commands and providing status information. All these elements are interconnected by bus 208, which allows data to be intercommunicated between the elements. I/O adapter 204 represents one or more I/O adapters or network interfaces that can connect to local or wide area networks such as, for example, the networks described in FIG. 1. Therefore, connection 224 represents a network or a direct connection to other equipment.

Processor 202 can be any type of processor capable of providing the speed and functionality required by the embodiments of the invention. For example, processor 202 could be a processor from family of processors made by Intel Corporation, Motorola Incorporated, Sun Microsystems Incorporated, Compaq Computer Corporation and others. Processor 202 may also comprise a digital signal processor (DSP) and accompanying architecture, such as a DSP from Texas Instruments Incorporated.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system 216, a program partition 212 and a data partition 214. In one embodiment of the invention, operating system 216 may comprise an operating system sold by Microsoft Corporation, such as Microsoft Windows® 95, 98, 2000 and NT, for example. Program partition 212 stores and allows execution by processor 202 of program instructions that implement the functions of each respective system described herein. In one embodiment of the invention, program partition 212 contains program instructions for a VPN module, an ARS module, an ANS module and a scheduling module. Of course, the scope of the invention is not limited to these particular sets of instructions. Data partition 214 is accessible by processor 202 and may store data used during the execution of program instructions for each module.

In one embodiment of the invention, the VPN module is configured to manage the VPN tunnels between a node and HARS 200. This may include creating a VPN tunnel, maintaining a VPN tunnel, or removing a VPN tunnel, for example. The VPN tunnel provides a virtual connection that may be used to communicate packets between a node and HARS 200. Typically, a single physical connection may carry packets communicated over multiple virtual connections, such as multiple VPN tunnels terminating at HARS 200. The term "terminating" as used herein may refer to an end point for a virtual connection. Referring again to FIG. 1, CSR 120 may have a plurality of virtual connections to HARS 118 via physical connection 122, for example.

In one embodiment of the invention, the virtual connection may be made secure using one or more security schemes, such as a symmetric scheme in accordance with the Data Encryption Standard (DES) or Triple DES (TDES) as defined by the National Institute of Standards and Technology, Federal Information Processing Standards Publication 46-3, Oct. 25, 1995, and available from "http://csrc.nist.gov/cryptval/des/desval.htrnl" ("DES Specification"), the IP Security (IPSEC) as defined by the IETF Information Document RFC 2411, November 1998("IPSEC Specification"), the Layer Two Tunneling Protocol (L2TP) as defined by the IETF Proposed Standard RFC 2661, August 1999("L2TP Specification"), a Secure Hypertext Transfer Protocol (S-HTTP) as defined by the IETF experimental standard RFC 2660, August 1999("S-HTTP Specification), or an asymmetric scheme in accordance with the Secure Sockets Layer (SSL) Protocol Version 3.0 Internet draft as defined by the IETF, November 1996("SSL Specification"), or the Transport Layer Security (TLS) Protocol draft standard as defined by the IETF RFC 2246, January 1999("TLS Specification), all of which may be available from "www.ietf.org," although the embodiments of the invention are not limited in this context.

In one embodiment of the invention, the VPN tunnel between a node and HARS 200 may be initially created in a secure manner as follows. A node, such as CSG 110 or CSG 112, may be configured to operate with a physical security key. The physical security key may include memory. The memory may be used to store security and configuration information for the node, such as an IP address of the node, a private key for the node, a public key for HARS 200, an administrative identifier and password for the node, routing information such as an IP subnet mask, an IP address of a connected device such as CSR 120, and so forth. Once the node is connected to the network, the node may initiate a start-up sequence that may include creating a secure VPN tunnel to HARS 200 using the information stored in the key's memory.

In one embodiment of the invention, the ARS module manages a routing table for HARS 200. The ARS module may perform, for example, the functions of receiving control information from a packet, searching the appropriate routing table to retrieve advanced routing information corresponding to the control information, and sending the advanced routing information to the scheduling module. The ARS module may also perform the function of managing one or more routing tables, including creating, updating and removing advanced routing information for each routing table in accordance with an advanced routing protocol, such as a dynamic routing protocol operating in accordance with the OSPF Specification or ISIS Specification, for example. Each routing table may be stored in memory, such as memory 210.

In one embodiment of the invention, the ANS module may perform the function of managing one or more ANS services. For example, HARS 200 may be configured to performing filtering functions. In this embodiment, HARS 200 may be equipped with a filter table that includes a list of source and/or destination IP addresses. The filter table may be used to determine whether a packet is passed to another network device. In another example, HARS 200 may be configured to manage resource or bandwidth allocations in accordance with one or more protocols. In one embodiment of the invention, HARS 200 may be configured to operate in accordance with the Resource Reservation Protocol (RSVP) as defined by the IETF RFC 2205, June 1994, which may be available from "www.ietf.org" ("RSVP Specification"). In accordance with RSVP, various control messages may be sent between a source and a destination node to set up a communication session, and reserve bandwidth for the communication session. The bandwidth reservation may comprise, for example, a predetermined constant bit rate (CBR) or variable bit rate (VBR) for the session. Information regarding each communication session and its reserved bandwidth are typically stored in a resource table, and updated periodically by the source and/or destination nodes. HARS 200 may be configured to manage and update this table, and may also coordinate with the scheduling module to perform packet scheduling to ensure that the CBR or VBR requirements for a particular session are met.

In one embodiment of the invention, the scheduling module may perform the function of receiving and sending packets over a virtual connection. HARS 200 may have one or more virtual connections to various nodes. The virtual connections may be, for example, VPN tunnels to CSG 110, CSG 112 or CSR 120. The scheduling module receives packets over the VPN tunnels, extracts control information for use by the ARS module, and receives routing information from the ARS module for use in routing the received packets to their next destination. The scheduling module may schedule each packet for communication over the appropriate VPN tunnel, in accordance with one or more conventional scheduling protocols. It is worthy to note that in one embodiment of the invention, HARS 200 is a server having a single physical network connection with multiple virtual connections. In this manner, a server may be configured to operate similar to a router, which typically has a plurality of physical network connections often referred to as "ports," with only a single physical network connection.

Although the VPN module, scheduling module and ARS module are described herein as separate software modules, it can be appreciated that the functionality performed by these modules may be implemented in a single module, or more modules, and still fall within the scope of the invention.

In one embodiment of the invention, I/O adapter 204 may comprise a network adapter or network interface card (NIC) configured to operate with any suitable technique for controlling communication signals between computer or network devices using a desired set of communications protocols, services and operating procedures, for example. In one embodiment of the invention, I/O adapter 204 may operate, for example, in accordance with the TCP/IP Specification. It can be appreciated that I/O adapter 204 may operate with any suitable technique for controlling communication signals between computer, servers, nodes or network devices using a desired set of communications protocols, services and operating procedures, for example, and still fall within the scope of the invention.

I/O adapter 204 also includes appropriate connectors for connecting I/O adapter 204 with a suitable communications medium. I/O adapter 204 may receive communication signals over any suitable medium such as copper leads, twisted-pair wire, co-axial cable, fiber optics, radio frequencies, and so forth.

Figure 3:
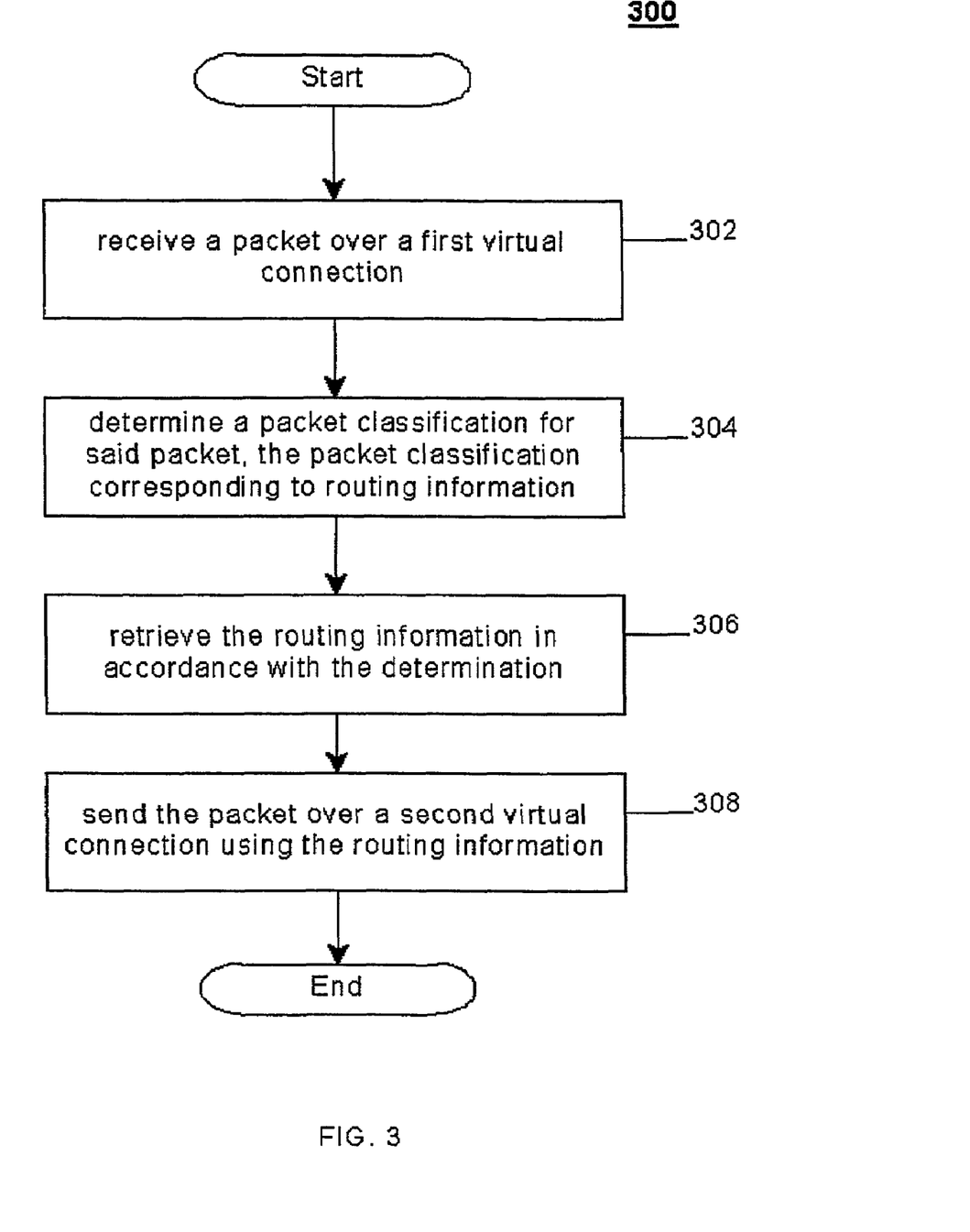
FIG. 3 is a block flow diagram of the programming logic performed by an Advanced Routing Services (ARS) module in accordance with one embodiment of the invention.
Figure 4:
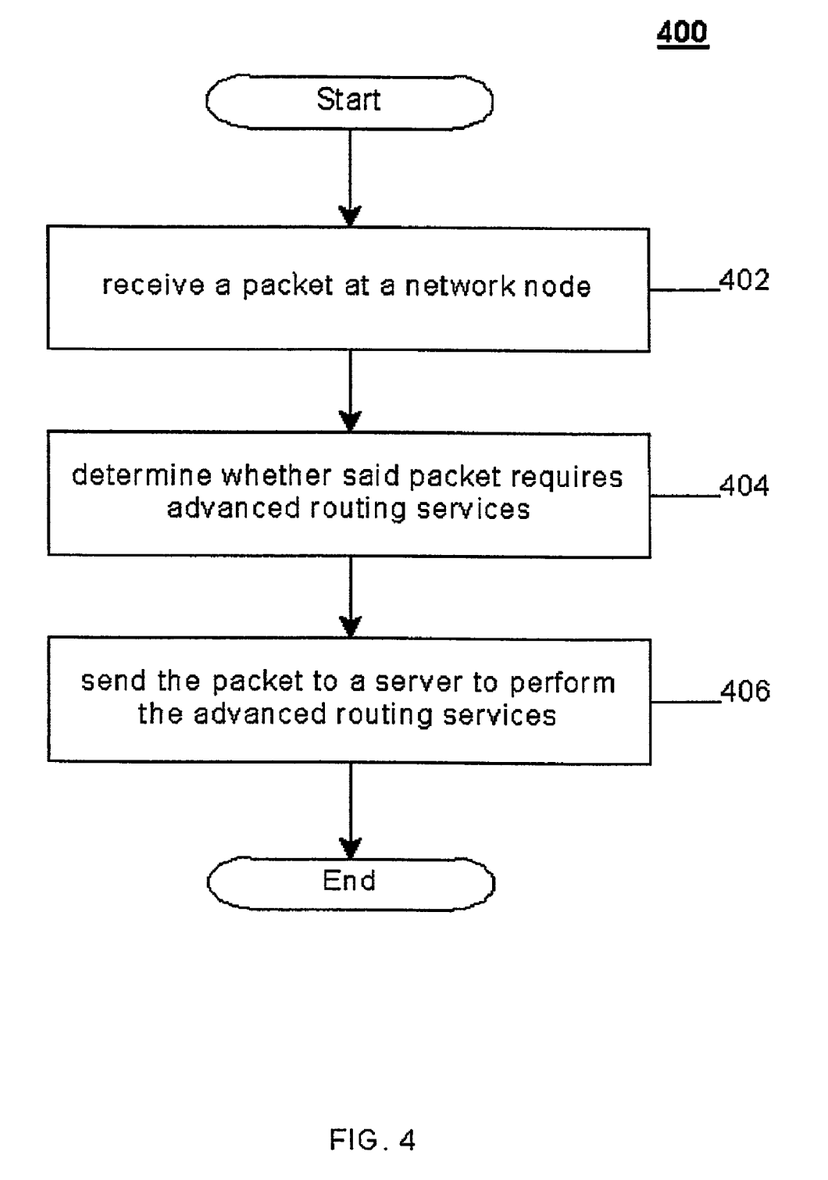
FIG. 4 is a block flow diagram of the programming logic performed by an intermediate node in accordance with one embodiment of the invention.

The operations of systems 100 and 200 may be further described with reference to FIGS. 3 and 4 and accompanying examples. Although FIGS. 3 and 4 presented herein may include a particular processing logic, it can be appreciated that the processing logic merely provides an example of how the general functionality described herein can be implemented. Further, each operation within a given processing logic does not necessarily have to be executed in the order presented unless otherwise indicated.

FIG. 3 is a block flow diagram of the programming logic performed by an Advanced Routing Services (ARS) module in accordance with one embodiment of the invention. According to a programming logic 300, a packet may be received over a first virtual connection at block 302. A packet classification may be determined for the packet, with the packet classification corresponding to routing information, at block 304. The routing information may be retrieved at block 306 in accordance with the determination at block 304. The routing information may be retrieved from, for example, a routing table stored in memory. The packet may be sent over a second virtual connection using the routing information at block 308.

In one embodiment of the invention, the first and second virtual connections are secure. This can be accomplished through use of any number of conventional encryption techniques. In another embodiment of the invention, the first and second virtual connections may comprise VPN connections, such as VPN tunnels.

In one embodiment of the invention, the routing information may comprise an address for a network node, such as an intermediate node on the path between the source and destination nodes. The address may comprise, for example, an IP address.

FIG. 4 is a block flow diagram of the programming logic performed by an intermediate node in accordance with one embodiment of the invention. As shown in FIG. 4, a programming logic 400 is described that when executed by a processor performs the functionality described herein. A packet may be received at a network node at block 402. The network node may determine whether the packet requires advanced routing services at block 404. The packet may send the packet to a server to perform the advanced routing services at block 406.

In one embodiment of the invention, the packet may be sent over a virtual connection. In another embodiment of the invention, the virtual connection may be a secure connection, using any number of conventional encryption techniques. In yet another embodiment of the invention, the virtual connection may be a VPN connection, such as a VPN tunnel.

In another embodiment of the invention, a node may receive the previously sent packet after processing by another node, such as HARS 200. The received packet may have, for example, advanced routing information that may be used to forward the packet to the next node on its path between the source and destination nodes. The node may then send the packet to the next node using the advanced routing information.

The operation of system 100 and the processing logic described with reference to FIGS. 3 and 4 may be better understood by way of example. Referring again to FIGS. 1 and 4, CSG 110 and CSG 112 may be configured to perform static and/or default routing, for example. They maintain routing tables that are manually configured and do not update the routing tables to reflect changes in the network. The term "manually configured" as used herein refers to a user accessing the routing table and storing routing information. An example of such a routing table is shown in Table 1 below.

TABLE 1

| Destination Address | Next Hop |
|---|---|
| 192.10.1.0/255.255.255.0 | 192.10.2.2 |
| 192.10.2.0/255.255.255.0 | 192.10.2.3 |
| 192.10.3.0/255.255.255.0 | 192.10.2.4 (HARS) |
| 192.20.X.X/255.255.255.0 | 192.10.2.4 (HARS) |
| Default/0 | 192.10.2.4 (HARS) |

In this example, Table 1 includes fields for a destination address and a next hop. The destination address may comprise, for example, an IP address and sub-net mask. A sub-net mask may comprise a 32-bit value that specifies how many bits in an IP address are to be used for the sub-net identifier portion of the IP address, for example. In this example, the routing table for CSG 110 may be set up for static and default routing. CSG 100 may receive a packet comprising a source IP address, a destination IP address and data. CSG 110 may retrieve a destination address from the received packet of "192.10.1.0." CSG 110 may search Table 1 and find that the "next hop" or next node address is "192.10.2.2." It then sends forwards the packet to "192.10.2.2" using the appropriate connection. In another example, CSG may receive another packet having a destination address of "192.10.3.0." CSG 110 may search Table 1 and find that the next hop is to address "192.10.2.4" which is the IP address for HARS 200. The routing table may be configured in this manner if it is known that CSG 110 may receive packets with a destination address of "192.10.3.0" that require advanced routing services, for example. In yet another example, CSG 110 may receive a packet having a destination address of "192.20.X.X," with X representing "0" or any positive integer. As with the previous example, CSG 110 will forward this packet to HARS 200 for processing. In one more example, CSG 110 may receive a packet having a destination address that is not in its routing table. In this case, the packet may be routed to HARS 200 as a default next hop.

In the above examples, CSG 110 may be configured to perform basic routing functionality, and yet still have access to advanced routing or network services if necessary. As a result, the complexity of CSG 110 may be reduced. Further, if there are any modifications desired to the advanced routing or network services, these modifications may be implemented at HARS 200 thereby requiring little, if any, modifications to any other intermediate nodes such as CSG 110, CSG 112 or CSR 120.

Referring again to FIGS. 1, 2 and 3, HARS 200 may be configured to perform advanced routing or network services in accordance with the embodiments of the invention. In one embodiment of the invention, HARS 200 may be configured to perform advanced routing services in accordance with the OSPF Specification. In this embodiment, HARS 200 may employ a routing table similar to the one shown in Table 2 below.

TABLE 2

| Destination Address | Next Hop | Hop Count |
|---|---|---|
| 192.10.4.0/255.255.255.0 | 192.10.3.2 | 120 |
|  | 192.10.2.2 | 200 |
| 192.10.5.0/255.255.255.0 | 192.10.3.3 | 130 |
| 192.10.6.0/255.255.255.0 | 192.10.3.3 | 70 |

In this example, Table 2 may include fields for a destination address, a next hop and a cost based on hop count. As with Table 1, the destination address may comprise, for example, an IP address and sub-net mask. In this embodiment, Table 2 illustrates a routing table that may be used, for example, to implement an advanced routing algorithm in accordance with OSPF Specification, including multipath or alternative path routing. HARS 200 may receive a packet over a first virtual connection having a destination address of "192.10.4.0." HARS 200 may use the destination address "192.10.4.0." to search for the next hop for the received packet. In this example, the next hop may be one of "192.10.3.2" or "192.10.2.2." In addition to the next hop, however, the routing table may provide an indication of the cost of using next hop that may take into account a cost associated with the various links within the network. The cost may factor in, for example, cost of the line if owned or leased, available bandwidth, distance between nodes, and so forth. As shown in Table 2, the cost for using the route through "192.10.3.2" is 120 while the cost for using the route through "192.10.2.2" is 200. Consequently, HARS 200 may be configured to select "192.10.3.2" since its cost is lower than "192.10.2.2." HARS 200 may then forward the packet to "192.10.3.2" over a second virtual connection.

In addition, HARS 200 may determine a packet classification for the packet. The term "packet classification" as used herein may refer to control information that may identify a routing protocol, service provider, class of service, a TCP connection, and so forth, although the embodiments of the invention are not limited in this context. For example, the packet classification for the received packet may indicate that this packet is part of a virtual area network for a particular service provider. HARS 200 may then search a list in its memory using the packet classification to retrieve, for example, any special instructions for handling of the packet. For example, HARS 200 may maintain several routing tables, and the packet classification may indicate that a particular routing table is to be used to retrieve routing information for the received packet. In another example, the packet classification may indicate that the received packet should be passed through an address filter, such as a firewall, to determine whether it should be passed on to the next hop or dropped from the network entirely.

In one embodiment of the invention, HARS 200 may be configured to perform a number of ANS functions. For example, HARS 200 may be configured to implement resource reservation in accordance with the RSVP Specification. In another example, HARS 200 may be configured to perform label switching in accordance with the Multiprotocol Label Switching Architecture (MPLS) protocol draft standard as defined by the IETF RFC 3031, January 2001("MPLS Specification"), or the Label Distribution Protocol (LDP) draft standard as defined by the IETF RFC 3036, January 2001("LDP Specification"), both of which may be available from "www.ietf.org." To implement these or other protocols, HARS 200 may be configured to use a flow table. An example of a flow table suitable for use in accordance with one embodiment of the invention is shown in Table 3.

entire flow table to each intermediate node on a periodic or aperiodic basis, based on a desired design goal.

Each intermediate node may be configured to pass packets to HARS 200 as follows. In one embodiment of the invention, each intermediate node may be configured to pass all packets to HARS 200 based on predetermined information in a packet header. The predetermined information may comprise, for example, an IP protocol number. The packets may comprise, for example, data packets or control packets. The term "data packet" as used herein may refer to a packet of information that a user intends to communicate between a source and destination node. The term "control packet" as used herein may refer to a packet of information that one or more network nodes may use to communicate the data packet between the source and destination nodes. This may be desirable when all the functions associated with an ARS or ANS is offloaded to HARS 200. In another embodiment of the invention, each intermediate node may be configured to pass just the control packets to HARS 200. This may be desirable if part of the functionality associated with an ARS or ANS is offloaded to HARS 200. An example may comprise managing a flow table for resource reservation. In this example, an intermediate node may forward RSVP control packets to HARS 200 to manage the flow table, and the intermediate node may forward RSVP data packets to its next hop based on information received from HARS 200.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to perform routing in a network, comprising:
   receiving a packet to be routed to a destination and a request for advanced routing information at a hosted advanced routing server from an intermediate node configured to perform basic routing services for said packet, said hosted advanced routing server configured to perform advanced routing services required to route said packet to said destination which are not included in said basic routing services;
   determining a packet classification for said packet, said packet classification representing control information

TABLE 3

| Source IP | Destination IP | Protocol | Source Port # | Dest Port # | DSCP Byte |
|---|---|---|---|---|---|
| 192.10.4.0/255.255.255.0 | 192.10.3.3 | HTTP | 2000 | 80 | CBR |
| 192.10.5.0/255.255.255.0 | 192.10.3.3 | PPP | 2001 | 25 | VBR |

In this example, Table 3 may represent a flow table with six fields: a source IP address, a destination IP address, a protocol, a source port number, a destination port number, and a Differentiated Services Code Point (DSCP) Byte. Table 3 may be used to implement an ANS, such as LDP, RSVP, MPLS, NAT, PAT, filtering, firewall and many others. HARS 200 would be responsible for receiving any control information associated with managing and maintaining the flow table. Each intermediate node having a secure virtual connection to HARS 200 may be configured to pass any packets having such control information to HARS 200. HARS 200 may then provide information from the flow table to an intermediate node upon request, or HARS 200 may send a portion or the used to identify one of multiple routing tables, with said identified routing table having a destination address, multiple routing paths for a next hop corresponding to said destination address, and a cost based on a hop count associated with each of said multiple routing paths, said identified routing table implementing a dynamic routing protocol to receive periodic or aperiodic updates to said multiple routing paths and associated costs for each of said multiple routing paths;

selecting one of said multiple routing paths as a next hop for said packet having a lower cost than another one of said multiple routing paths;

retrieving advanced routing information corresponding to said packet classification for said selected next hop; and
routing said packet to said destination using said advanced routing information.

2. The method of claim 1, wherein said packet is received and routed using a virtual connection.

3. The method of claim 1, wherein said virtual connection is secure.

4. The method of claim 1, wherein said retrieving comprises retrieving said advanced routing information from said identified routing table.

5. A method to perform routing in a network, comprising:
receiving a request for advanced routing information for a packet to be routed to a destination at a hosted advanced routing server from an intermediate node configured to perform basic routing services for said packet, said hosted advanced routing server configured to perform advanced routing services required to route said packet to said destination which are not included in said basic routing services;
determining a packet classification for said packet, said packet classification representing control information used to identify one of multiple routing tables, with said identified routing table having a destination address, multiple routing paths for a next hop corresponding to said destination address, and a cost based on a hop count associated with each of said multiple routing paths, said identified routing table implementing a dynamic routing protocol to receive periodic or aperiodic updates to said multiple routing paths and associated costs for each of said multiple routing paths;
selecting one of said multiple routing paths as a next hop for said packet having a lower cost than another one of said multiple routing paths;
retrieving advanced routing information corresponding to said packet classification for said selected next hop; and
sending said advanced routing information to said intermediate node.

6. The method of claim 5, wherein said packet is received and routed using a virtual connection.

7. The method of claim 6, wherein said virtual connection is secure.

8. The method of claim 5, wherein said retrieving comprises retrieving said advanced routing information from said identified routing table.

9. A method to perform advanced routing services in a network, comprising:
receiving a request for an advanced routing service for a packet to be routed to a destination at a hosted advanced routing server from an intermediate node over a first virtual connection, said intermediate node configured to perform basic routing services for said packet, said hosted advanced routing server configured to perform advanced routing services required to route said packet to said destination which are not included in said basic routing services;
determining a packet classification for said packet, said packet classification representing control information used to identify one of multiple routing tables, with said identified routing table having a destination address, multiple routing paths for a next hop corresponding to said destination address, and a cost based on a hop count associated with each of said multiple routing paths, said identified routing table implementing a dynamic routing protocol to receive periodic or aperiodic updates to said multiple routing paths and associated costs for each of said multiple routing paths;
selecting one of said multiple routing paths as a next hop for said packet having a lower cost than another one of said multiple routing paths;
retrieving advanced routing information corresponding to said packet classification for said selected next hop; and.

10. The method of claim 9, wherein said first and second virtual connections are secure.

11. An article comprising:
a storage medium;
said storage medium including stored instructions that, when executed by a processor, result in performing routing in a network by receiving a packet to be routed to a destination and a request for advanced routing information at a hosted advanced routing server from an intermediate node configured to perform basic routing services for said packet, said hosted advanced routing server configured to perform advanced routing services to route said packet to said destination which are not included in said basic routing services, determining a packet classification for said packet, said packet classification representing control information used to identify one of multiple routing tables, with said identified routing table having a destination address, multiple routing paths for a next hop corresponding to said destination address, and a cost based on a hop count associated with each of said multiple routing paths, said identified routing table implementing a dynamic routing protocol to receive periodic or aperiodic updates to said multiple routing paths and associated costs for each of said multiple routing paths, selecting one of said multiple routing paths as a next hop for said packet having a lower cost than another one of said multiple routing paths, retrieving advanced routing information corresponding to said packet classification for said selected next hop, and routing said packet to said destination using said advanced routing information.

12. The article of claim 11, wherein the stored instructions, when executed by a processor, further result in receiving said and routing a secure virtual connection.

13. An article comprising:
a storage medium;
said storage medium including stored instructions that, when executed by a processor, result in performing advanced routing services at an advanced routing services provider in a network by receiving a request for an advanced routing service for a packet to be routed to a destination over a first virtual connection from an intermediate node configured to perform routing services for said packet, said advanced routing service not included in said routing services, determining a packet classification for said packet, said packet classification representing control information used to identify one of multiple routing tables, with said identified routing table having a destination address, multiple routing paths for a next hop corresponding to said destination address, and a cost based on a hop count associated with each of said multiple routing paths, said identified routing table implementing a dynamic routing protocol to receive periodic or aperiodic updates to said multiple routing paths and associated costs for each of said multiple routing paths, selecting one of said multiple routing paths as a next hop for said packet having a lower cost than another one of said multiple routing paths, retrieving advanced routing information corresponding to said packet classification for said selected next hop, and sending said packet over a second virtual connection using said advanced routing information.

14. The article of claim 13, wherein the stored instructions, when executed by the processor, further result in receiving and sending over a secure virtual connection.

15. A system, comprising:

a communication medium; and a hosted advanced routing server to connect to said communication medium, said hosted advanced routing server operative to receive a packet to be routed to a destination and a request for advanced routing information from an intermediate node configured to perform basic routing services for said packet, said hosted advanced routing server configured to perform advanced routing services to route said packet to said destination which are not included in said basic routing services, said hosted advanced routing server to determine a packet classification for said packet, said packet classification representing control information used to identify one of multiple routing tables, with said identified routing table having a destination address, multiple routing paths for a next hop corresponding to said destination address, and a cost based on a hop count associated with each of said multiple routing paths, said identified routing table implementing a dynamic routing protocol to receive periodic or aperiodic updates to said multiple routing paths and associated costs for each of said multiple routing paths, said hosted advanced routing server further operative to select one of said multiple routing paths as a next hop for said packet having a lower cost than another one of said multiple routing paths, retrieve advanced routing information corresponding to said packet classification for said selected next hop, and route said packet to said selected next hop using said advanced routing information or send said advanced routing information to said intermediate node.

16. The system of claim 15, wherein a virtual connection to said hosted advanced routing server is established over said communication medium.

17. The system of claim 16, wherein said virtual connection comprises a secure virtual connection.

* * * * *

UNITED STATES PATENT AND TRADEMARK OFFICE
CERTIFICATE OF CORRECTION

PATENT NO. : 7,664,119 B2
APPLICATION NO. : 09/823459
DATED : February 16, 2010
INVENTOR(S) : Steve Adams et al.

It is certified that error appears in the above-identified patent and that said Letters Patent is hereby corrected as shown below:

Drawings:
In Sheet 2 of 4, Figure 2, Reference Numeral 214, line 1, delete "Paritions" and insert -- Partitions --, therefor.

In column 14, line 5, in Claim 9, delete "and." and insert -- and sending said packet over a second virtual connection using said advanced routing information. --, therefor.

In column 14, line 38, in Claim 12, delete "a" and insert -- the --, therefor.

In column 14, line 38, in Claim 12, after "receiving" delete "said".

Signed and Sealed this

Twentieth Day of April, 2010

David J. Kappos
*Director of the United States Patent and Trademark Office*

FIG.2

UNITED STATES PATENT AND TRADEMARK OFFICE
CERTIFICATE OF CORRECTION

| | | |
|---|---|---|
| PATENT NO. | : 7,664,119 B2 | Page 1 of 1 |
| APPLICATION NO. | : 09/823459 | |
| DATED | : February 16, 2010 | |
| INVENTOR(S) | : Adams et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Twenty-eighth Day of December, 2010

David J. Kappos
*Director of the United States Patent and Trademark Office*